Oct. 13, 1964  J. L. PECZKOWSKI ET AL  3,152,444
FUEL CONTROL APPARATUS FOR TURBO-SHAFT ENGINES
Filed March 1, 1961  3 Sheets-Sheet 1
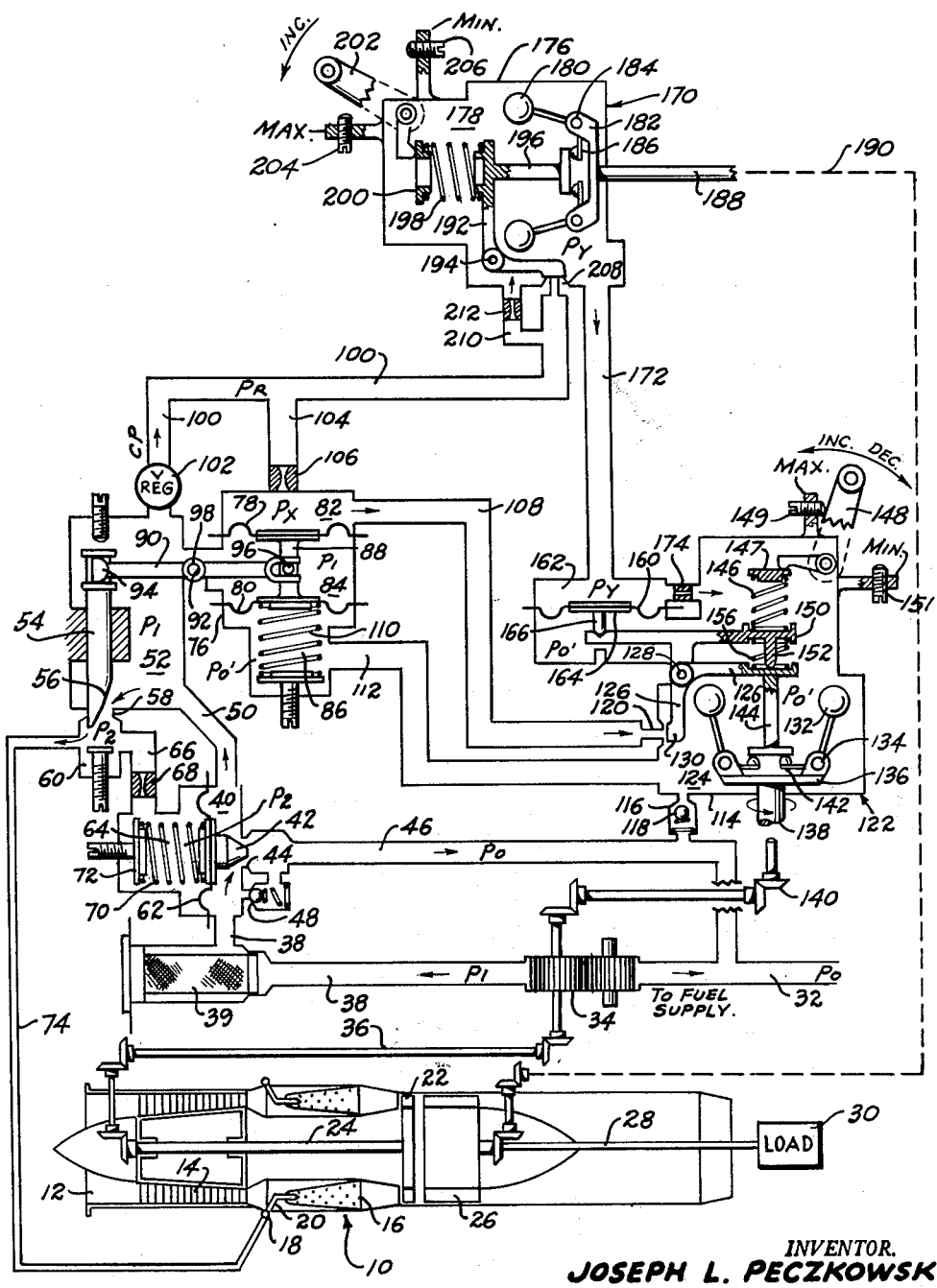
FIG_1
INVENTOR.
JOSEPH L. PECZKOWSKI,
FRANCIS R. ROGERS.
BY
AGENT.

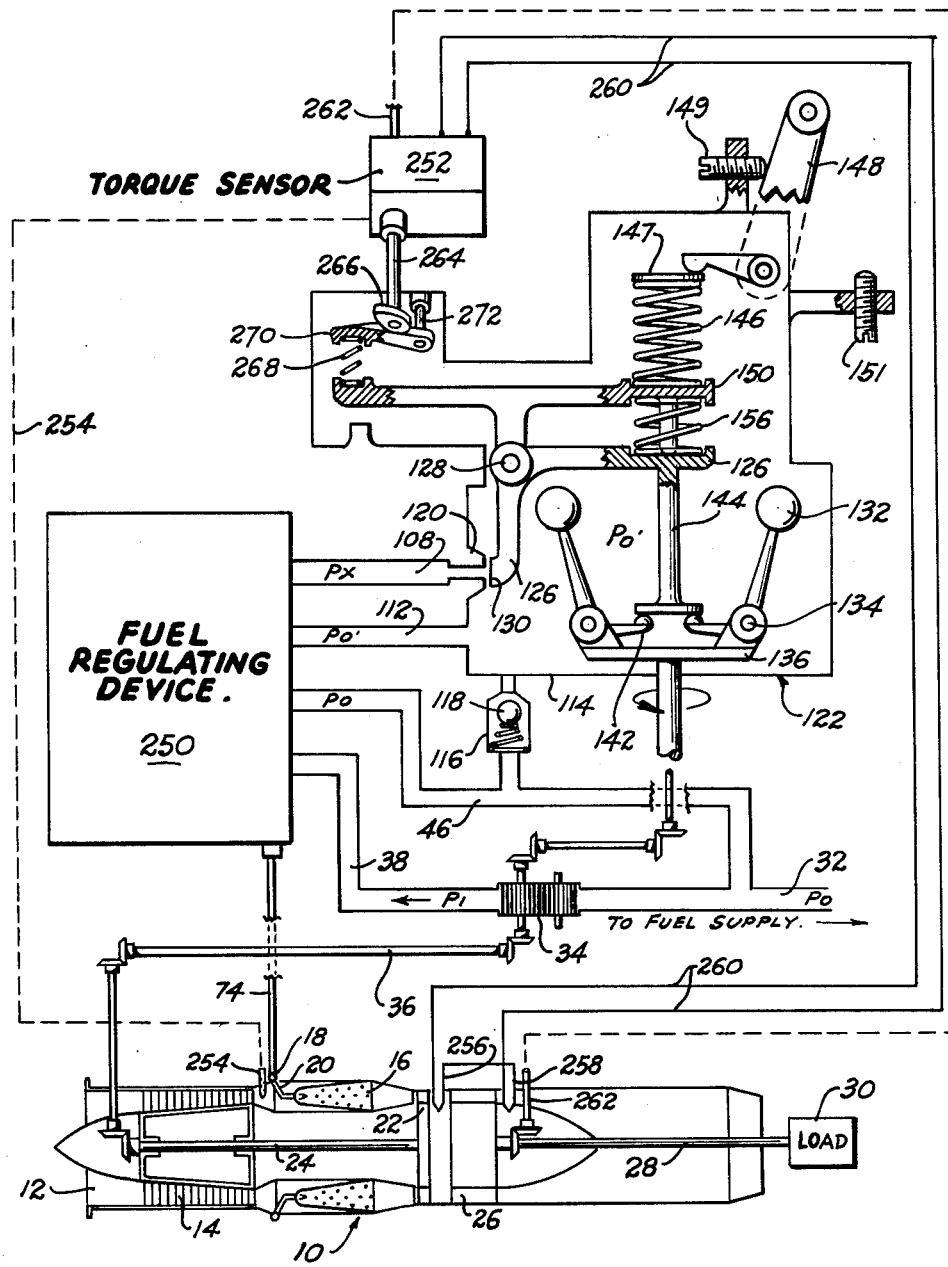
FIG_2

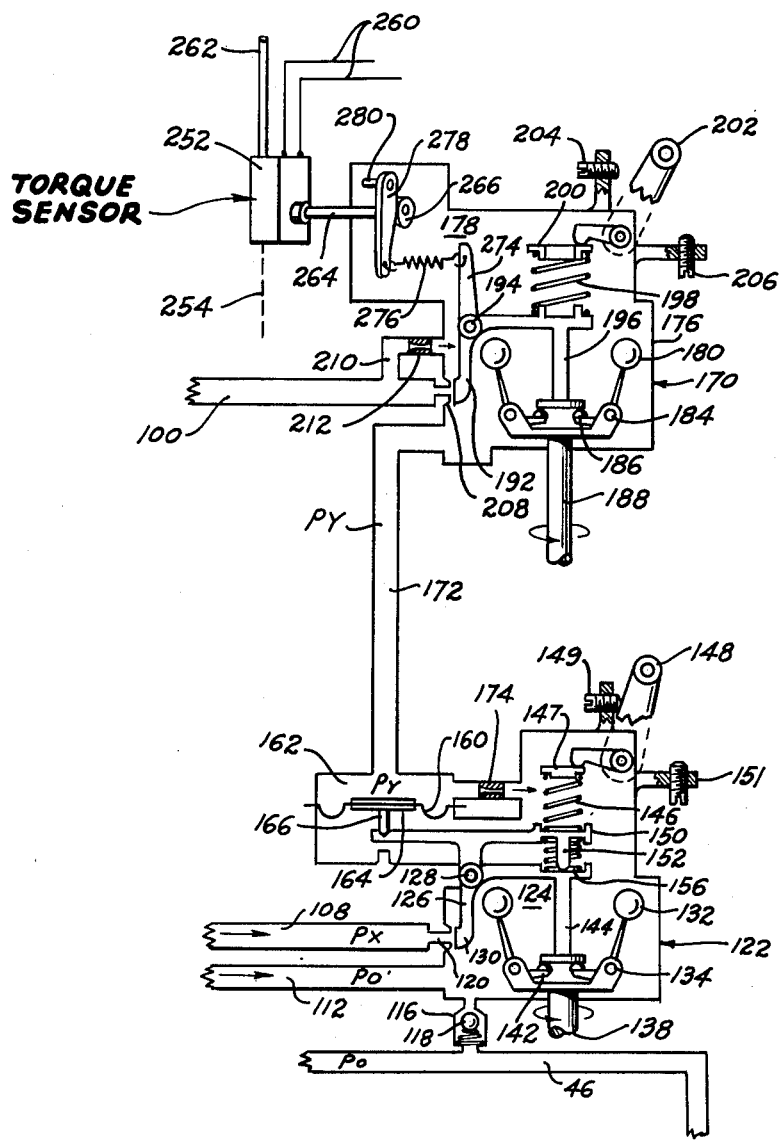

United States Patent Office 3,152,444
Patented Oct. 13, 1964

3,152,444
FUEL CONTROL APPARATUS FOR TURBO-SHAFT ENGINES
Joseph L. Peczkowski and Francis R. Rogers, South Bend, Ind., assignors to The Bendix Corporation, South Bend, Ind., a corporation of Delaware
Filed Mar. 1, 1961, Ser. No. 92,617
9 Claims. (Cl. 60—39.16)

The present invention relates to fuel control apparatus for turbo-shaft engines and more particularly to fuel control apparatus including a governor and output condition responsive reset mechanism for controlling the rate of fuel delivery in a manner to limit or maintain regulated output shaft characteristics such as speed, torque, power or the like.

A turbo-shaft engine for purposes of this disclosure is defined as an engine having basically two sections; first, a gas or energy producing section, and second, a power take-off or energy absorbing section. In a relatively simple species of such an engine, the gas producing section includes a compressor, a combustion section, and a turbine for driving the compressor; whereas the power take-off section includes an independently rotatable power absorbing turbine coupled to an output drive shaft for providing a usable shaft output. It should be understood that this definition is not intended to exclude more complex variations of turbo shaft engines having for example split or multiple compressors or a plurality of power talk-off sections or turbines or other additional engine elements.

Fuel control apparatus designed to limit shaft output characteristics of the turbo shaft engine should include both means to regulate fuel to achieve the desired condition, and also should regulate the change in such a manner that the gas producer section does not exceed its design limitations or become unstable in operation. Prior art devices for solving this problem are generally characterized by providing only maximum fuel or speed limitations on the gas producer section when maintaining a regulated shaft output condition, thus permitting the gas producer to be basically unregulated when operating below these maximum limitations. It has been found that this unregulated condition leads to engine instability particularly when the shaft output is driving significantly high inertia loads such as a helicopter or the like. Further the problem is often compounded by the fact that the gas producer limitations are themselves variable with gas producer speed.

Accordingly, it is a primary object of the present invention to provide a fuel control apparatus for continuously regulating the gas producer speed of a turbo-shaft engine while simultaneously regulating shaft output characteristics such as speed, torque, power or the like.

It is a further object of the present invention to provide a governor and output condition responsive reset mechanism for controlling the fuel delivery to a turbo-shaft engine wherein the governor is operative to control the gas producer speed and the reset mechanism is operative to reset the governor in response to output shaft characteristics.

It is a still further object of the present invention to provide fuel control apparatus for a gas turbine engine having a compressor driven turbine and a power take-off turbine, said apparatus having an adjustable governor means for controlling compressor turbine speed and a reset mechanism for resetting said governor in response to speed, torque, or power delivered by said power take-off turbine.

Other objects and advantages of the present invention will become apparent on consideration of the description and attached drawings wherein:

FIGURE 1 is a schematic illustration of fuel control apparatus in accordance with the present invention associated with a turbo-shaft engine wherein the regulated turbo-shaft condition is used.

FIGURE 2 is a schematic of a modification of the fuel control apparatus of FIGURE 1 modified to regulate turbo-shaft torque conditions, and FIGURE 3 is a third partial schematic view of a third modification of fuel control apparatus wherein speed and torque output shaft conditions are combined to provide an output power regulation device.

Referring ot FIGURE 1, there is shown at the bottom of the drawing a turbo-shaft engine generally designated by numeral 10 comprised of an air intake duct 12, a rotating air compressor 14, a series of annularly arranged combustion chambers 16 receiving fuel from manifold 18 through individual fuel nozzles 20, a compressor driving turbine 22, a shaft 24 for drivably connecting compressor 14 and turbine 22, and an independently rotating output turbine 26 coupled to an output drive shaft 28. Output driven shaft 28 is adapted to be connected to any desired load mechanism 30. The section of engine 10 from intake duct 12 to and including turbine 22 may be considered the gas producing section wherein air is received, pressurized, mixed with fuel, and burned to produce a gaseous mixture of high energy content. A portion of the combustion product energy is absorbed by turbine 22 for driving compressor 14. The section of engine 10 including turbine 26 and shaft 28 may be considered the power take-off or energy absorbing section which receives the high energy combustion products from the gas producing section and converts this energy to a rotating shaft output.

The rate of fuel delivery to manifold 18 is regulated by the fuel control apparatus of FIGURE 1 associated with engine 10 to control the speed of output shaft 28 at any adjustable set value while maintaining continuous regulation of the speed of turbine 22 and compressor 14. The structure for accomplishing this object is comprised of the following four basic subcomponents; first, a fuel regulating device operative to control the rate of fuel delivery in response to an input signal; second, a first adjustable speed governor responsive to gas producer speed for supplying the input signal to the fuel regulating device; third, a reset mechanism for automatically adjusting the setting of the first governor device, and fourth, a second adjustable governor device responsive to shaft output speed for supplying a controlling signal to the reset mechanism.

The fuel regulating device subcomponent includes a conduit 32 for supplying fuel from a source, not shown, at a relatively low pressure, $P_0$, to high pressure pump 34 which is engine driven by means of rotating shaft connection 36. Fuel is pressurized by pump 34 and delivered at a relatively high pressure value, $P_1$, to pump outlet conduit 38. A screen filter element member 39 is disposed in conduit 38 for reducing fuel impurities and to prevent system contamination. $P_1$ fuel from conduit 38 flows to chamber 40 containing by-pass valve 42 which is operative with orifice 44 to regulate the quantity of excess fuel returned to the pump inlet conduit 32 via conduit 46. Spring loaded high pressure relief valve 48 is provided in parallel flow relationship around valve 42 and orifice 44 to limit the maximum value of $P_1$ that might cause rupture or other failure of the system parts. $P_1$ fuel then continues from chamber 40 through conduit 50 to a second chamber 52 which contains axially slidable metering valve 54 having a contoured end 56 operative with orifice 58 to define a variable restrictive metering area. Fuel passing through the restriction defined by valve 54 and orifice 58 encounters a pressure loss such that fuel discharged into a chamber 60 is at a lesser pressure than $P_1$ and is designated $P_2$ pressure fuel. In the fuel system illustrated, the difference between $P_1-P_2$ pressure fuels is preferably held constant so that metering is dependent on the axial position of metering valve 54. To accomplish this object a diaphragm 62 is secured at its center to by-pass valve 42 and peripherally to the housing defining chamber 40 such that it forms one movable wall of chamber 40 and is exposed on one surface to $P_1$ pressure fuel. A further chamber 64 is defined on the reverse side of diaphragm 62 and is connected by conduit 66 to chamber 60 which contains $P_2$ fuel. A restrictive bleed is disposed in conduit 66 to dampen pressure fluctuations and stabilize the operation of diaphragm 62. A compression spring member 70 is contained in chamber 64 and is retained between diaphragm 62 on one end and an externally adjustable spring retainer member 72 on the other. Thus, $P_2$ pressure fuel plus the force produced by spring 70 act on diaphragm 62 to produce a force acting in opposition to that produced by $P_1$ pressure fuel in chamber 40. Thus by-pass valve 42 is controlled to by-pass sufficient fuel to conduit 46 so that $P_1-P_2$ pressure is maintained a constant value. Should $P_1-P_2$ increase, diaphragm 62 and valve 42 is displaced to the left permitting more fuel to by-pass metering valve 54 and thus restoring $P_1-P_2$ differential to its original value. Should $P_1-P_2$ decrease substantially the reverse operation occurs. Retainer 72 may be externally adjusted to vary the preload of spring 70 on diaphragm 62 and thus establish the desired differential between $P_1-P_2$. Metered fuel from chamber 60 at $P_2$ pressure is transmitted through conduit 74 to manifold 18 and from thence is consumed in engine 10.

Fluid pressure responsive means for positioning metering valve 54 is contained in housing 76 and includes two equal area diaphragms 78 and 80 secured by their outer edges to housing 76 and thereby define three subcompartments 82, 84 and 86. These diaphragms are secured at their centers by rod connection 88 so that said diaphragms are jointly movable in response to the sum of the forces acting thereon. A lever member 90 is pivoted at 92 and is connected to metering valve 54 at 94 and rod member 88 at 96. Thus the net force acting on diaphragms 78 and 80 is operative to axially position metering valve 54. $P_1$ pressure fluid is transmitted to compartment 84 by means of connection 98 and acts equally on the inner faces of diaphragms 78 and 80 such that the effect of $P_1$ pressure is neutralized as a controlling force. This arrangement of diaphragms makes it unnecessary to provide sealing means between chamber 52 and the pressure responsive means which would interfere with the free movement of lever 90. Control fluid from chamber 52 enters conduit 100 containing constant pressure regulating valve 102 and is designated $P_R$ pressure fluid. This control fluid is taken from chamber 52 only because it contains a readily available high fluid pressure source, and it should be understood that any high pressure fluid source could be used including sources that are separate or part of the fuel system and may be of either a hydraulic or pneumatic nature. Compartment 82 on the upper side of diaphragm 78 is fluidly connected to conduit 100 by means of conduit 104 which contains the restrictive bleed member 106 which permits only a restricted rate of fluid flow and causes a pressure loss such that fluid in chamber 82 is designated $P_X$ (pressure of variable value) pressure fluid. A further conduit 108 is connected to compartment 82 for exhausting fluid therefrom and thus regulate the value of $P_X$ pressure. If for example, there is no fluid flow out of compartment 82 through conduit 108 there will shortly be no fluid flow through restriction 106 and consequently no pressure drop thereacross and $P_X$ will equal $P_R$. If, however, fluid is conducted out of compartment 82 via conduit 108, fluid will flow through restriction 106 causing a pressure loss so that $P_X$ will be less than $P_R$ pressure. The greater the flow from compartment 82 the lesser the value of $P_X$ pressure will be and thus the force on diaphragm 78 will be controlled in proportion to the rate of flow through conduit 108. Compartment 86 ad-jacent the lower surface of diaphragm 80 contains means producing a force on the double diaphragm assembly that opposes that produced by $P_X$ pressure fluid and is comprised of a first component produced by adjustable spring member 110 which is proportional to the movement of rod 88 and the degree of compression of said spring, and a second component produced by fluid pressure in said compartment acting over the surface of diaphragm 80. Conduit 112 supplies fluid at a relatively low pressure $P_0'$ to compartment 86 from governor housing 114, which drains through conduit 116 having spring loaded check valve 118 to conduit 46 containing $P_0$ pressure fluid. The value of $P_0'$ is an insignificant increment greater than $P_0$ due to the presence of check valve 118 which insures that the system fully fills with fluid. $P_0'$ fluid in compartment 86 may, if desired, be eliminated without substantially altering system operation. It will be observed that the movement of the pressure responsive means comprised of diaphragm 78 and 80 and connecting rod 88 and therefore the movement of metering valve 54 is controlled by varying $P_X$ pressure in compartment 82 against the force opposition of spring 110, and also $P_X$ pressure may be varied by controlling the fluid flow out of conduit 108. Thus the fuel regulating apparatus thus far described accomplishes the object of metering the rate of fuel delivery to engine 10 in response to the input signal $P_X$.

A first adjustable all speed governor responsive to gas producer speed for controlling the input signal $P_X$ is generally designated by numeral 122. Conduit 108 terminates at fixed orifice 120 formed in the housing 114 of the governor. Housing 114 defines an interior chamber chamber 124 which contains a movable lever 126, pivotably mounted at 128, and having an end 130 arranged in close proximity to fixed orifice 120 to control the fluid flow therefrom and thus the value of $P_X$.

Chamber 124 also contains a pair of governor centrifugal weight members 132 pivotably secured at 134 to rotating table member 136. A drive shaft member 138 extends externally from housing 114 and is adapted to be driven in relation to the speed of first turbine or gas producer 22 either by direct connection or other suitable connection such as the illustrated drive connection 140 connected to engine driven pump 34. The force produced by weights 132 is transmitted by lever projections 142 formed as part of the weights to rod 144 which is secured to an end of pivoted lever 126. A second force is applied in an opposing direction to lever 126 by governor setting spring 146 which is confined between a movable retainer 147 on one end and pivoted lever 150 on the other. Lever 150 is secured to pivot 128 in common with lever 126 and includes a downwardly extending projection 152 formed on the right end that normally abuts lever 126, so that in most conditions of operation levers 150 and 126 physically rotate together and may be regarded as one. Movable retainer 147 is positioned by external throttle or control lever member 148 so that the relative compression of said spring and hence the force normally acting downwardly on lever 126 is directly related to throttle setting. Maximum and minimum adjustable setting stops 149 and 151 respectively are secured to the housing of gas producer governor 122 to establish the limits of settings of throttle 148. An idling spring 156 is concentrically mounted about the projection 152 and confined between levers 150 and 126. The force required to compress idle spring 156 sufficiently to permit projection 152 to abut lever 126 is designed to be slightly less than the minimum force produced by setting spring 146 so that for most conditions of operation, projection 152 and lever 126 are in abutting relationship and the effect of spring 156 on the system may be neglected. The conditions under which idle spring 156 affects the governor operation can be more conveniently described at a later point in this specification.

Thus, lever 126 or the total structure comprised of lever 126, lever 150, and spring 156 are urged in a counterclockwise direction by a first force produced by speed weights 132 and in clockwise direction by a second force produced by setting spring 146. When these forces are in balance, the flow of $P_X$ fluid from conduit 108 and orifice 120 is just sufficient to control metering valve 54 such that the rate of fuel delivery maintains a stable engine speed. If due to some external disturbance or load change the speed of turbine 22 should tend to increase, flyweights 132 will rotate faster producing more force tending to rotate lever 126 counterclockwise moving the end 130 away from orifice 120 and permitting $P_X$ pressure in chamber 82 to drop. The resulting drop of $P_X$ causes metering valve 54 to move in a closed direction, reducing the fuel rate, and restoring engine speed to its set value. If speed of turbine 22 should tend to decrease, substantially the reverse operation occurs with $P_X$ and rate of fuel delivery being increased to restore speed. The set speed of turbine 22 is changed by positioning throttle lever 148 within its range of travel. For example, if turbine 22 is running at a stable maximum speed with throttle lever 148 in approximately the illustrated position and it is desired to decrease speed of turbine 22, lever 148 is rotated a certain degree clockwise reducing the compression of setting spring 146 and the force acting downwardly on lever 126. Since the downward force on lever 126 is decreased without an immediate reduction of upward force from weights 132, lever 126 will rotate counterclockwise reducing $P_X$ and the rate of fuel delivery until the speed of turbine 22 obtains the new lower set speed value. Higher set speed values will be obtained by actuating throttle lever 148 in the reverse direction.

A reset mechanism for automatically resetting the speed setting of governor 122 as established by the position of throttle 148 is also contained within housing 114. A pressure responsive member or diaphragm 160 is peripherally secured to the interior of housing 114 so that one side is exposed to $P_0'$ fluid in chamber 124 and is further operative to define a chamber 162 on the upper side thereof in conjunction with the walls of said housing. A plate member 164 is clamped at the center of diaphragm 160 and includes a rod projection 166 which extends into contactive engagement with an extension of lever 150 so that the net force produced by the fluid pressures acting on diaphragm 160 is transmitted to lever 150 in a direction opposing the force applied by setting spring 146. Thus for a given setting of throttle 148, the force applied by diaphragm 160 to lever 150 is operative to reduce the speed setting from a maximum established by said throttle.

The fluid pressure generating the primary force on diphragm 160 is designated $P_Y$ and its value controls the degree of resetting affected by diaphragm 160. Continuous flow of $P_Y$ fluid is supplied by conduit 172 to chamber 162 and is dumped to $P_0'$ reservoir in chamber 124 through restrictive bleed 174 contained in an inner wall of housing 114.

Control of $P_Y$ pressure is affected by a second adjustable speed governor 170 responsive to output shaft speed which therefore supplies the controlling signal to the reset mechanism. Governor 170 includes a housing 176 defining an interior chamber 178 containing a pair of centrifugal weights 180 pivoted to rotating table member 182 at pivot 184, said weights including lever projections 186. Table 182 is secured to an externally extending drive shaft 188 adapted to be connected to output turbine 26 and drive shaft 28 as indicated by dashed line 190 representative of any well known rotary connection. Governor chamber 178 further includes a movable lever 192 which is pivotally secured to housing 176 by pivot 194, said lever includes an extension 196 for contacting lever projections 186 of flyweights 180 so that a force directly related to the speed of turbine 26 is received which tends to rotate lever 192 counterclockwise. A setting spring 198 is confined between lever 192 and adjustable retainer 200 to provide a speed setting force acting on lever 192 which opposes the centrifugal weight generated force. An output speed or throttle lever 202 is provided to permit external manipulation of adjustable retainer 200 and thereby adjustment of the speed set force. Adjustable maximum and minimum setting setting stops 204 and 206 respectively are secured to the external surface of housing 176 to provide setting limits for throttle 202.

Chamber 178 of output speed governor 170 is supplied pressurized control fluid by conduit 100 which terminates at fixed restriction or servo orifice member 208 formed in the housing 176. One end of lever 192 is arranged in close proximity to restriction 208 such that the rate of fluid flow through said restriction is dependent on the relative position of lever 192 and restriction 208. Passage 210 containing restriction 212 is connected to conduit 100 and chamber 178 in parallel with restriction 208 to provide a minimum flow of fluid for lubrication of the governor weights, which flow might otherwise be interrupted when lever 192 fully closes restriction 208. Restriction 212 is sized sufficiently small, however, so that a significant range of $P_Y$ pressure variation may be achieved by movement of lever 192 with respect to restriction 208.

Shaft output speed governor 170 operates in a manner substantially similar to that described in connection with gas producer governor 122, with the exceptions that governor 170 has no reset mechanism and receives a speed rotation input related to shaft output speed rather than the speed of gas producer turbine 22. Briefly, a speed force from weights 180 is opposed by a setting force from spring 198 acting on lever 192. When speed increases, lever 192 moves clockwise further opening restriction 208 and increasing $P_Y$ pressure. When speed decreases, lever 192 moves clockwise and reduces $P_Y$. $P_Y$ is transmitted to gas producer governor 122 via conduit 172 to control the degree of resetting action.

The embodiment of the present invention shown in FIGURE 1 and described above will control the shaft output speed at a selected value while maintaining continuous regulation over the speed of turbine 22 and compressor 14. Assume for example that it is desired to drive load 30 at a regulated speed value and that the load characteristic is such that maximum engine power rating may be required to sustain this speed at times. Throttle lever 148 of the gas producer governor 122 would be advanced to its maximum setting against stop 149 and throttle member 202 of the shaft output speed governor 170 positioned at the desired output shaft speed setting which may be an intermediate position setting as illustrated in FIGURE 1. With these throttle settings at start conditions, orifice 208 of governor 170 and orifice 120 of governor 122 will be closed and $P_X$ at its maximum value since both governors would be at underspeed conditions. With $P_X$ at its maximum value, metering valve 54 will be wide open supplying the maximum rate of fuel delivery to rapidly accelerate the engine. It is contemplated that any well known acceleration and deceleration limiting device may be added to the present invention to control transient fuel flows so that overtemperature, surge, and lean flame out are avoided as taught for example in U.S. Patent 2,581,275 by Frank C. Mock and assigned to a common assignee along with the present case. Normally, gas generator turbine 22 will attain its selected speed first due to the inherent lag produced by the gaseous fluid coupling between the gas generator and turbine 26, however, for low output shaft speed settings and small driven loads it is possible for turbine 26 to obtain its selected speed first. Under the first contingency, as turbine 22 obtains its selected speed the force generated by flyweights 132 will balance that produced by setting spring 146 of governor 122, opening orifice 120 and reducing $P_X$ and the rate of fuel delivery to a value just sufficient to maintain selected speed of turbine 22, which for the assumed conditions was a maximum speed value. The gas generator is now delivering maximum power to output turbine 26 which therefore continues to accelerate until it obtains its selected speed. On obtaining selected speed of turbine 26, flyweights 180 of governor 170 overcomes the force of spring 198, opening orifice 208 and increasing $P_Y$ pressure. As $P_Y$ increases, an increased force is applied to lever 150 opposing that of set spring 146 and thus effectively reducing the setting of governor 122 so that an overspeed condition exists with orifice 120 being opened further and $P_X$ and fuel delivery reduced. The speed of turbine 22 will continue to be reset downwardly until the power produced by the gas generator delivered to turbine 26 is just sufficient to maintain turbine 26 at the stable selected output speed whereupon no further resetting action occurs. Under the second contingency when turbine 26 obtains selected speed first, the sequence is merely reversed with the resetting action of governor 170 being initiated first thus causing an earlier force balance in governor 122.

If turbine 26 tends to deviate from its speed setting due to load variations, it will cause a corrective setting action by varying $P_Y$ and quickly resume its selected value. If turbine 22 tends to deviate in speed, the deviation will be felt by governor weights 122 which will initiate a corrective $P_X$ change such that the speed of both turbines is under continuous control.

Since the resetting action of governor 170 is operative only to reduce the speed setting of governor 122, the maximum turbine 22 speed is established by the position of lever 148. However, in order to guard against the contingency that governor 170 will continue to reset the speed setting of governor 122 downwardly to the point where the rate of fuel delivery is no longer sufficient to support combustion, low-rate idle spring 156 is provided to establish a minimum force on lever 126. As $P_Y$ keeps increasing it will effectively nullify more and more of the force of spring 146. When this force is reduced below the preload value of spring 156, levers 150 and 126 will separate and spring 156 maintains a relatively constant force on lever 126 regardless of any further increases in $P_Y$ pressure, thus establishing the minimum or idle speed setting for governor 122.

It has been found that this arrangement of fuel control apparatus will lead to a significant improvement in engine acceleration time since greater stability and decreased time lag are achieved by directly controlling the gas producer speed. This enables the designer to utilize significantly greater governor gains than in prior art arrangements which steepen the governor droop characteristics and increase the responsiveness of the engine to a change in condition.

Referring now to FIGURE 2 there is shown a modification of our invention wherein the controlled output shaft condition is torque rather than speed. Parts corresponding with those shown in FIGURE 1 bear identical numerals. The apparatus comprising the fuel regulating device having the function of regulating the rate of fuel delivery in response to an input signal is represented by the single block 250. In this arrangement the output shaft governor 170 of the FIGURE 1 species is replaced by any well known torque sensor for either directly or indirectly measuring the output torque of shaft 28 and effecting resetting action on gas producer governor 122 in response to the measured torque. In the preferred embodiment, a torque sensor 252 is provided which is capable of indirectly sensing output torque by measuring certain engine parameters and computing the torque value. One set of engine parameters capable of supplying the necessary information for indirectly sensing torque are: compressor discharge pressure supplied by pressure connection 254; output turbine temperature drop supplied by thermocouples 256 and 258 and electrical wire connection 260; and output shaft speed supplied by rotary connection 262. These parameters may be combined in torque sensor 252 to produce a rotary shaft output on shaft 264 as a measure of torque in a manner taught in copending application Serial No. 838,158, filed September 4, 1959, whose inventors are Donald W. Howard and Warner C. Wintrode, and is assigned to a common assignee with the present case. It should be understood that other torque sensors well known in the art may be utilized if desired. Shaft 264 extends externally within housing 114 and includes a cam 266 drivably secured thereto. Gas producer governor 122 is modified by replacing the reset diaphragm 160 of the FIGURE 1 species with a mechanical force producing arrangement comprised of the compression spring 268 and movable lever 270 pivoted to the housing 114 at 272. Torque measuring cam 266 bears against lever 270 to position said lever and vary the compression of spring 268 in response to torque variations. Thus the resetting action of governor 122 becomes a measure of output torque.

Except for output torque being the controlling reset condition rather than speed, the operation of the FIGURE 2 species is in accordance with that described in connection with FIGURE 1.

Referring to FIGURE 3, a third modification of the present invention is partially shown wherein both output speed and torque are combined to produce an indication of output power and thereby control the resetting action as a measure of power. In this view governors 170 and 122 are shown disassociated from the fuel regulating apparatus and engine and the connections thereto may be the same as those illustrated in FIGURE 1. Parts corresponding to those illustrated in other modifications bear identical numerals.

In the FIGURE 3 modification, movable lever 192 of governor 170 is modified to include an extension leg 274. In addition, a tension spring 276 is secured on one end to leg 274 and on the other to movable lever 278 which is pivoted at 280. Torque sensor 252 is arranged so that shaft 264 extends internally within governor 170 and torque cam 266 bears on the inner side of lever 278 to position the lever and vary the tension in spring 276 as a measure of torque. Further, the torque force applied to lever 192 is arranged to aid the force supplied by centrifugal weights 180 such that the combined speed and torque forces are opposed by the force of setting spring 198. With this arrangement the position of throttle lever 202 is selective of shaft power output and governor 122 will be reset to control power output.

It should be understood that the three modifications of the present invention shown and disclosed herein are representative of preferred forms of the invention. Various changes in the structure shown or substitution of equivalent structures well known in the art may be made to suit individual requirements without departing from the scope of the present invention as defined in the claims.

We claim:

1. Fuel control apparatus for a turbo-shaft engine having a compressor driving turbine and an output turbine for driving an output shaft comprising: fuel regulating means adapted to control the rate of fuel delivery to the engine, a governor device responsive to the speed of said compressor driving turbine and connected to said fuel regulating means to control the fuel delivery at a rate to maintain a regulated speed of said compressor driving turbine, said governor including adjustable setting means operative to establish the regulated speed value which said governor is operative to control, reset means connected to said adjustable setting means and operative to reduce the regulated speed setting, and torque responsive means responsive to the torque delivered by the engine output shaft, said torque responsive means being connected to said reset means to control the degree of resetting in response to output shaft torque.

2. Fuel control apparatus for a turbo-shaft engine having a compressor driving turbine and an output turbine for driving an output shaft comprising: fuel regulating means adapted to control the rate of fuel delivery to the engine, a governor device responsive to the speed of said compressor driving turbine and connected to said fuel regulating means to control the fuel delivery at a rate to maintain a regulated speed of said compressor driving turbine, said governor including adjustable setting means operative to establish the regulated speed value which said governor is operative to control, reset means connected to said adjustable setting means and operative to reduce the regulated speed setting, and power responsive means responsive to the power delivered by the engine output shaft, said power responsive means being connected to said reset means to control the degree of resetting in response to the power delivered by the engine output shaft.

3. Fuel control as claimed in claim 2 wherein said power responsive means is comprised of an output shaft speed sensor, an output shaft torque sensor, and means combining the speed and torque senses to produce an indication of power.

4. Fuel control means as claimed in claim 3 including manually adjustable power setting means connected to said power responsive means to establish the desired power value delivered by said output shaft.

5. Fuel control apparatus for a turbo-shaft engine having a compressor driving turbine and an output turbine for driving an output shaft comprising: fuel regulating means adapted to control the rate of fuel delivery to the engine in response to an input signal; governor means connected to said fuel regulating means operative to supply a controlling input signal therefor; said governor including a speed responsive flyweight device adapted to be driven by said compressor driving turbine to produce a speed force, adjustable force producing means operative to produce a manually selectable setting force, and a movable member interposed between said flyweight device and said adjustable force producing means and movable in response to the difference between said speed force and said setting force to produce said input signal; reset mechanism including a fluid pressure responsive member connected to said movable member and arranged to apply a reset force thereto which aids said speed force and opposes said setting force; and sensing means responsive to an output shaft condition operative to produce a fluid control pressure that varies with said output shaft condition; said sensing means connected to said reset mechanism for supplying said fluid control pressure to said fluid pressure responsive member to control the magnitude of said reset force in response to variations in the sensed output shaft condition.

6. Fuel control apparatus as claimed in claim 5 wherein the output condition sensed by said sensing means is output shaft speed.

7. Fuel control apparatus as claimed in claim 5 wherein the output condition sensed by said sensing means is output shaft torque.

8. Fuel control apparatus as claimed in claim 5 wherein the output condition sensed by said sensing means is power delivered by said output shaft.

9. Fuel control apparatus for a turbo-shaft engine having a compressor driving turbine and an output turbine for driving an output shaft comprising: fuel regulating means adapted to control the rate of fuel delivery to the engine in response to an input signal; movable lever means connected to said fuel regulating means to supply a controlling input signal therefor that varies with lever movement; speed means connected to said movable lever means and adapted to be driven by the engine compressor driving turbine to provide a speed force acting on said lever means that varies with compressor turbine speed; a speed setting spring connected to said movable lever means to provide a speed setting force acting on said lever means in opposition to said speed force; a reset mechanism responsive to a shaft output condition and connected to said movable lever means to apply a reset force thereto that varies in response to said output condition and opposes said speed setting force, said movable lever being movable in response to the sum of the forces acting thereon and operative to supply said input signal that varies with said movement; said movable lever means is comprised of first and second normally abutting lever members pivoted about a common pivot and idle spring means interposed between said lever members, said idle spring means operative to cause separation between said first and second lever members when the difference between the speed setting force and reset force becomes less than the compression force of said idle spring and thereby interrupt the controlling effect of said speed setting spring and said reset mechanism.

References Cited in the file of this patent
UNITED STATES PATENTS

| | | |
|---|---|---|
| 2,378,037 | Reggio | June 12, 1945 |
| 2,629,982 | Hooker | Mar. 3, 1953 |
| 2,841,957 | Thorpe | July 8, 1958 |
| 2,931,442 | Stanton | Apr. 5, 1960 |
| 3,034,583 | Best | May 15, 1962 |

FOREIGN PATENTS

| | | |
|---|---|---|
| 817,395 | Great Britain | July 29, 1959 |
| 1,233,457 | France | Oct. 12, 1960 |

OTHER REFERENCES

"Gas Turbine Engine Governing Bulletin 40004B," Woodward Governor Company, Rockford, Illinois (received in Patent Office May 11, 1956).